(12) United States Patent
Johnson et al.

(10) Patent No.: US 8,413,967 B2
(45) Date of Patent: Apr. 9, 2013

(54) WET SCRUBBER TRAY

(75) Inventors: Ronald B. Johnson, Wadsworth, OH (US); Ronald Dureiko, Stow, OH (US); David Peterson, Uniontown, OH (US); J. Jeffrey Kidwell, Alliance, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 631 days.

(21) Appl. No.: 12/484,187

(22) Filed: Jun. 13, 2009

(65) Prior Publication Data
US 2009/0309245 A1    Dec. 17, 2009

Related U.S. Application Data

(60) Provisional application No. 61/061,900, filed on Jun. 16, 2008.

(51) Int. Cl.
*B01F 3/04* (2006.01)
(52) U.S. Cl.
USPC ............... 261/113; 261/114.3; 261/114.5
(58) Field of Classification Search ........... 261/113, 261/114.1, 114.3, 114.5
See application file for complete search history.

(56) References Cited

U.S. PATENT DOCUMENTS

| | | | | |
|---|---|---|---|---|
| 1,749,266 A * | 3/1930 | Sontag | ............... | 261/113 |
| 2,611,457 A * | 9/1952 | Glitsch | ............... | 261/114.1 |
| 2,767,967 A * | 10/1956 | Hutchinson | ............... | 261/113 |
| 2,860,860 A | 11/1958 | Wilson | | |
| 2,916,272 A | 12/1959 | Ragatz | | |
| 2,931,469 A | 4/1960 | Iglehart et al. | | |
| 3,759,497 A | 9/1973 | Black | | |
| 4,171,333 A * | 10/1979 | Moore | ............... | 261/94 |
| 4,263,021 A * | 4/1981 | Downs et al. | ............... | 95/224 |
| 4,673,464 A | 6/1987 | Zeitsch | | |
| 4,820,456 A * | 4/1989 | Kiselev | ............... | 261/111 |
| 5,246,471 A * | 9/1993 | Bhat et al. | ............... | 423/242.3 |

(Continued)

OTHER PUBLICATIONS

European Search Report for European counterpart application serial No. EP 09 16 2862, dated Dec. 15, 2009.

(Continued)

*Primary Examiner* — Charles Bushey
(74) *Attorney, Agent, or Firm* — Eric Marich

(57) ABSTRACT

An improved wet scrubber tray provides increased resistance to vibration-induced cracking. The tray is self supporting to eliminate wastage of raw material, and additional internal stiffeners added to the tray make multiple intermediate stiffeners. The connection of the intermediate stiffeners to the perforated bottom plate is changed to eliminate the shop weld in the bottom plate. The holes in the perforated bottom plate are repositioned so that they are moved away from the boundaries of the tray to reduce their influence on boundary conditions. The thickness of the tray material may be increased to lower the vibratory stresses. The mechanism for holding the trays themselves within the spray absorber tower is changed so that the trays are now held down by plate material that is attached to the support grid, but not to the trays. Three field welds are applied to the sides of each tray to hold the trays in place relative to each other and are strategically placed to allow adjacent side stiffeners to act together as a composite section, thus increasing their strength. Elastomeric material such as neoprene is used at the tray-to-grid attachments to increase the damping of the system. Formed features in the trays such as single or multiple ribs, bosses, domes or dimples may also be provided to increase tray stiffness or influence wet scrubber performance.

8 Claims, 18 Drawing Sheets

U.S. PATENT DOCUMENTS

| | | | |
|---|---|---|---|
| 6,267,359 B1 * | 7/2001 | Stippick | 261/114.5 |
| 6,923,852 B2 * | 8/2005 | Vrotsos | 96/296 |
| 2003/0019737 A1 * | 1/2003 | Matsumoto et al. | 203/99 |
| 2003/0127755 A1 | 7/2003 | Eaton, Jr. | |
| 2004/0080059 A1 * | 4/2004 | Weiland et al. | 261/79.2 |
| 2006/0065988 A1 * | 3/2006 | Burton et al. | 261/113 |
| 2006/0185320 A1 | 8/2006 | Dureiko et al. | |
| 2009/0047194 A1 * | 2/2009 | Nascimento et al. | 422/211 |

OTHER PUBLICATIONS

Kitto and Stultz, Eds., Steam its generation and use, 41st Ed., Copyright 2005, The Babcock & Wilcox Company, Barberton, Ohio, U.S.A., Chapter 35, pp. frontispiece and 35-1 through 35-19.

* cited by examiner

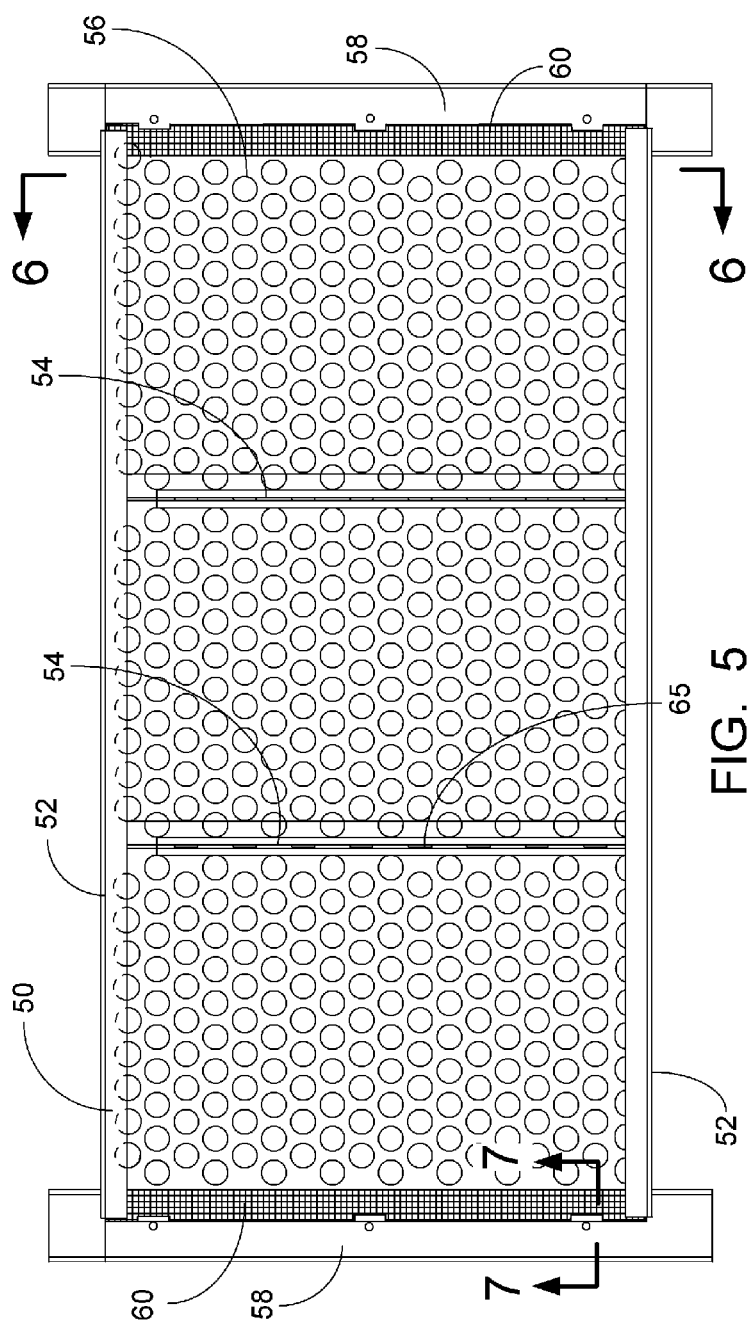
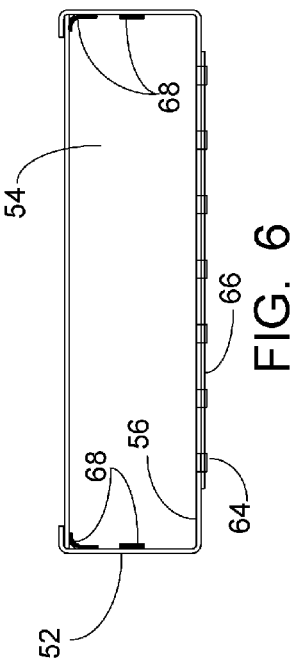
FIG. 5
FIG. 6

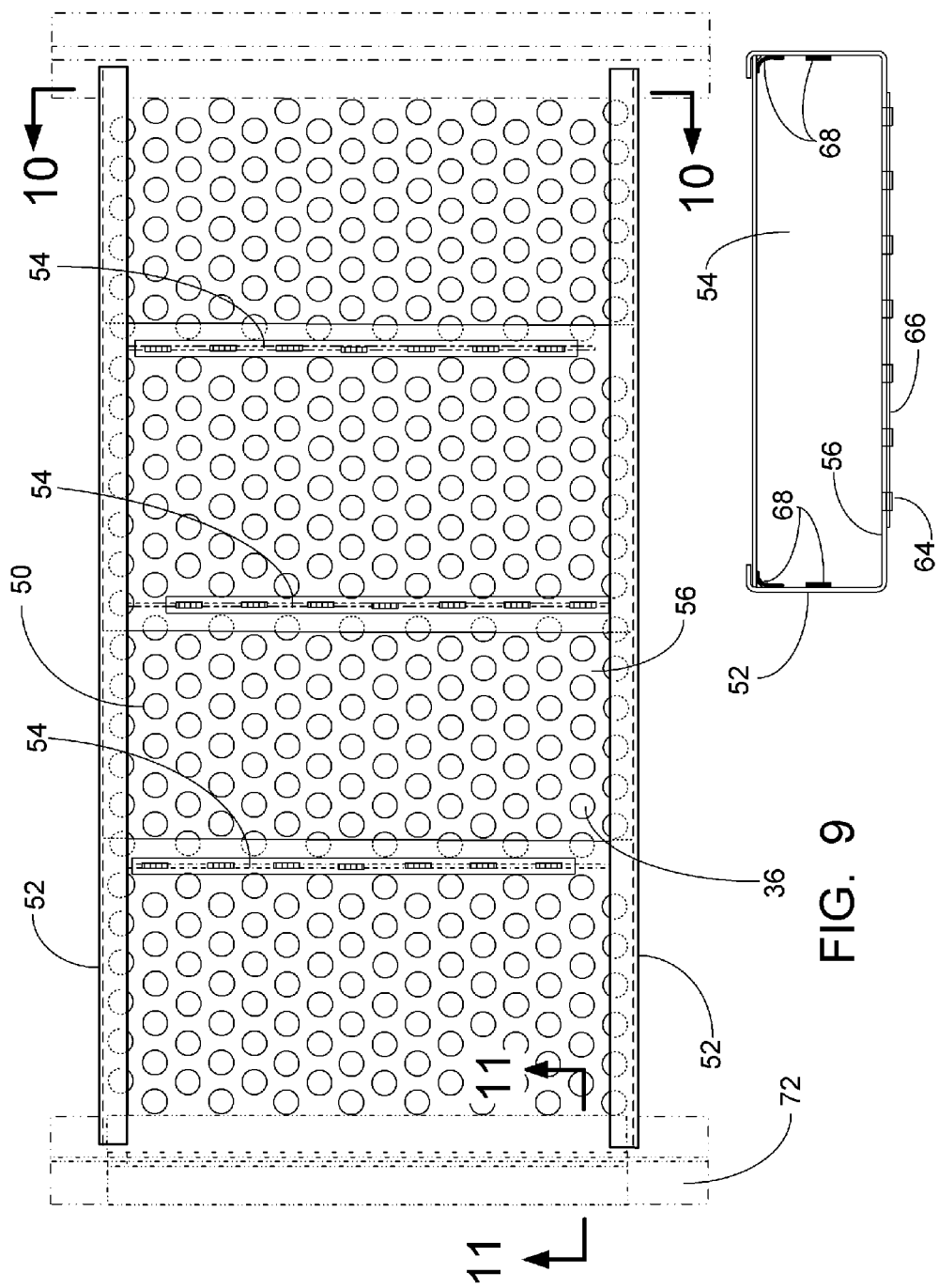

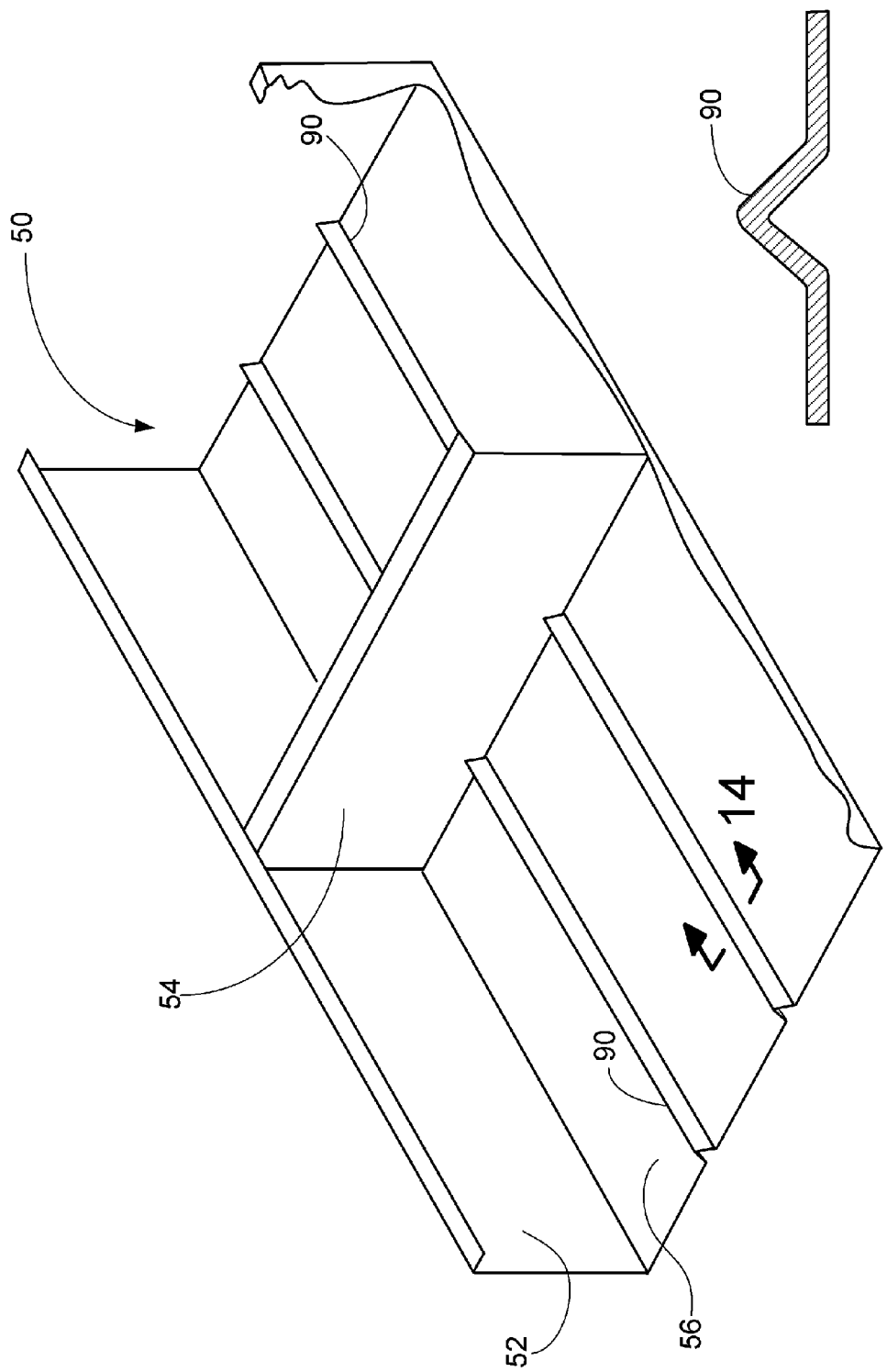

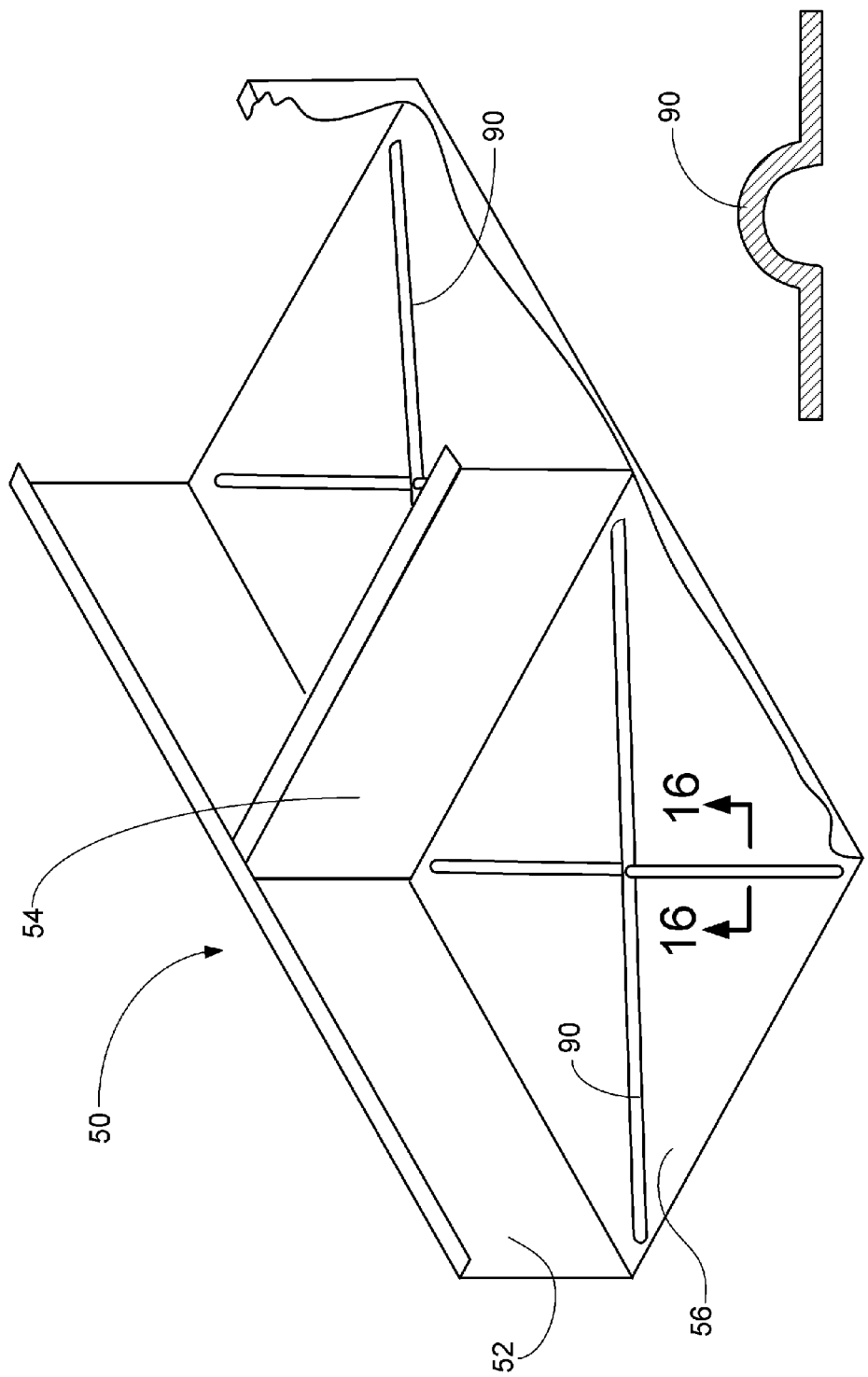

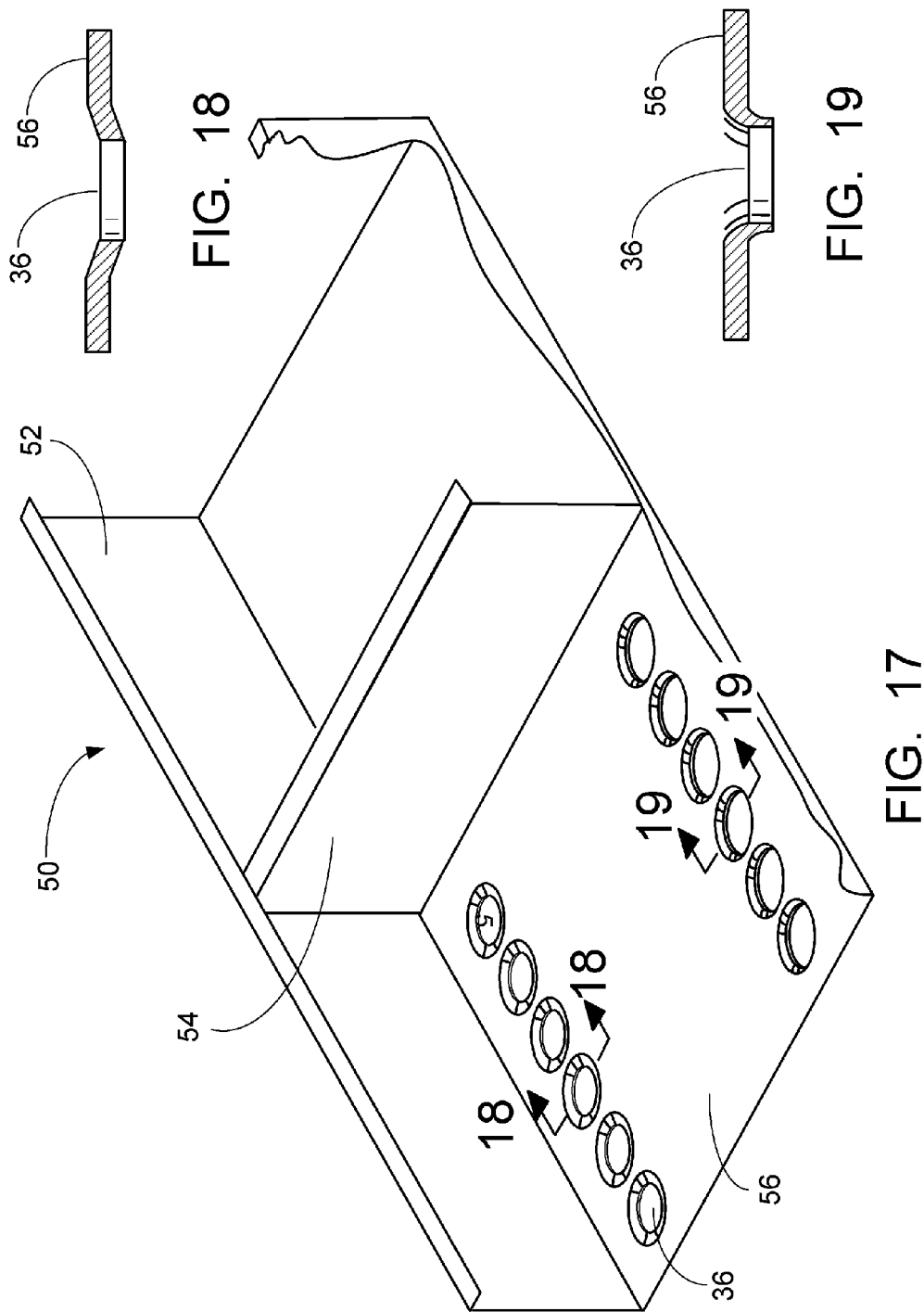

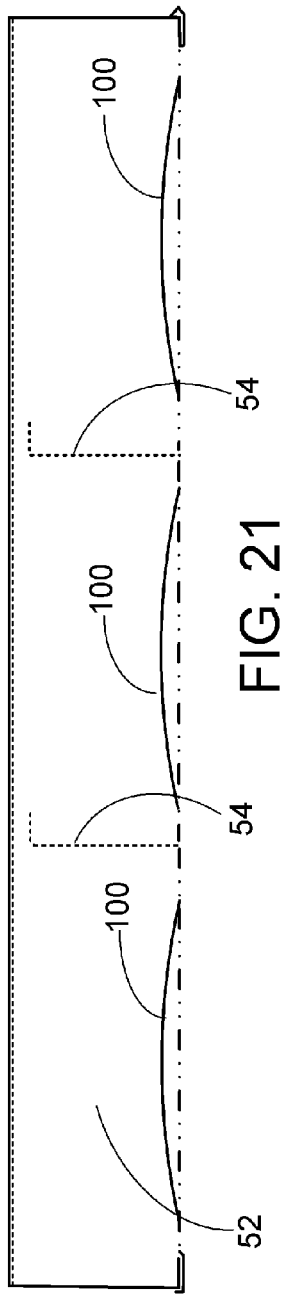
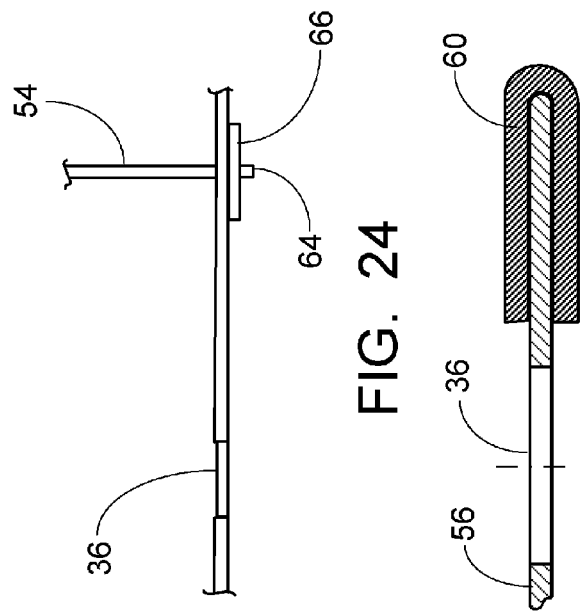
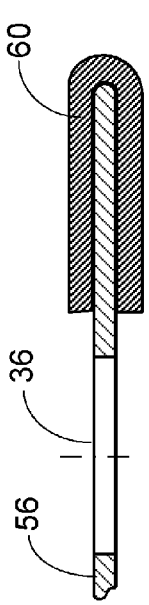
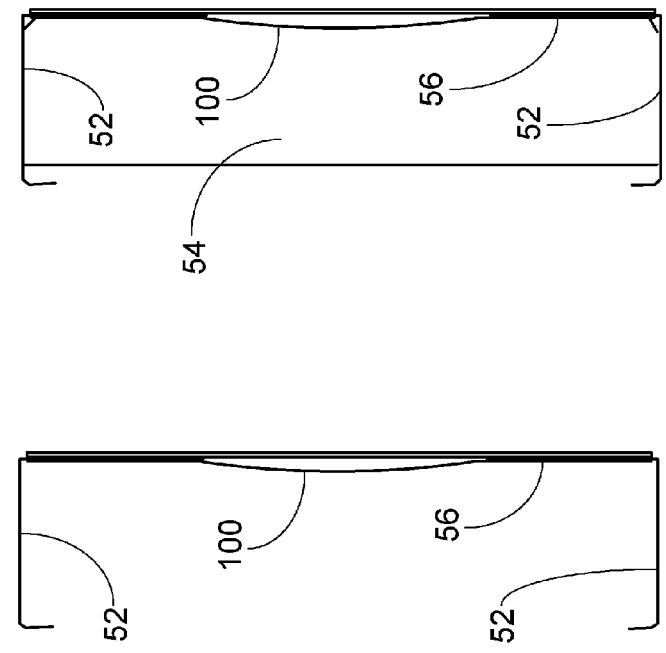

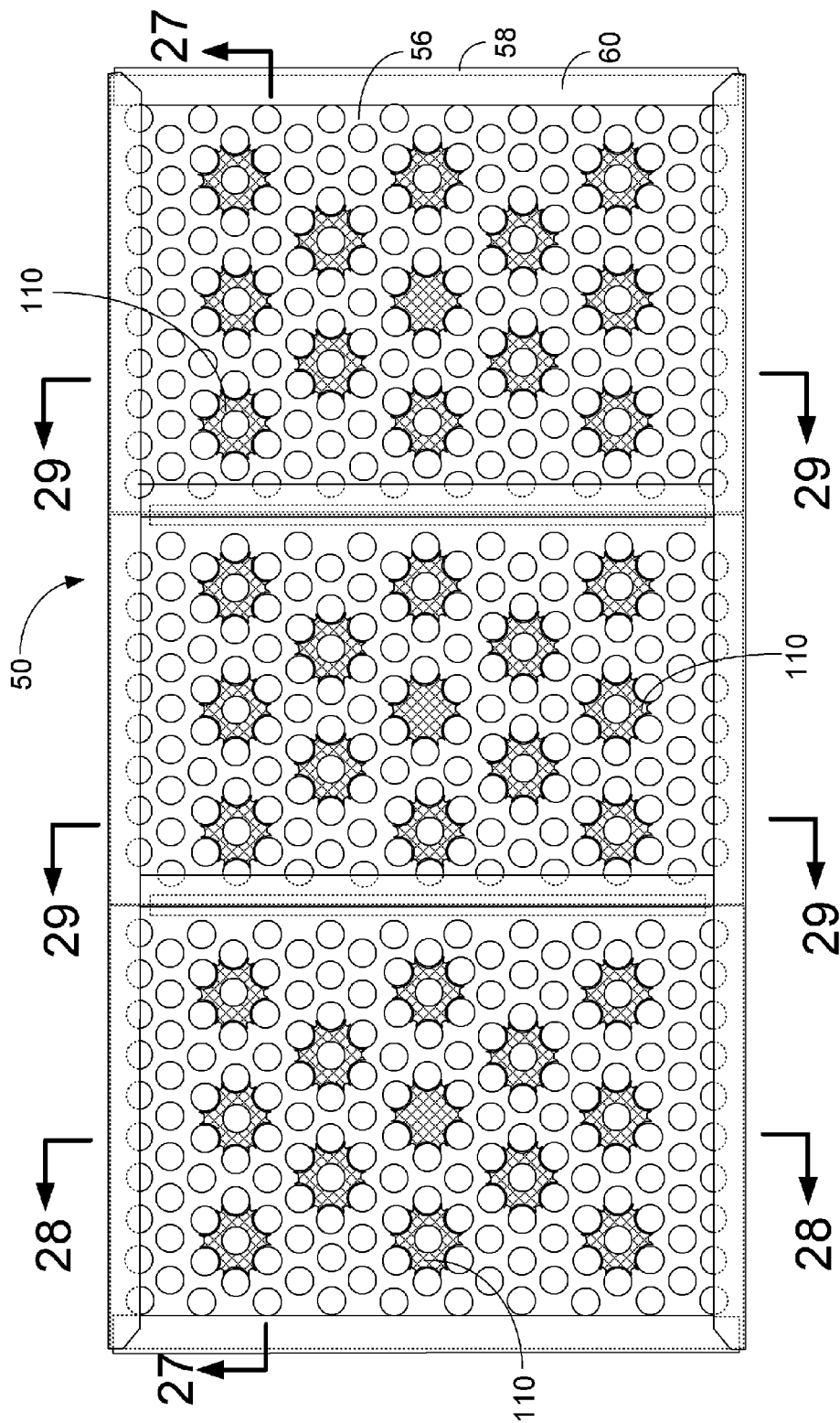

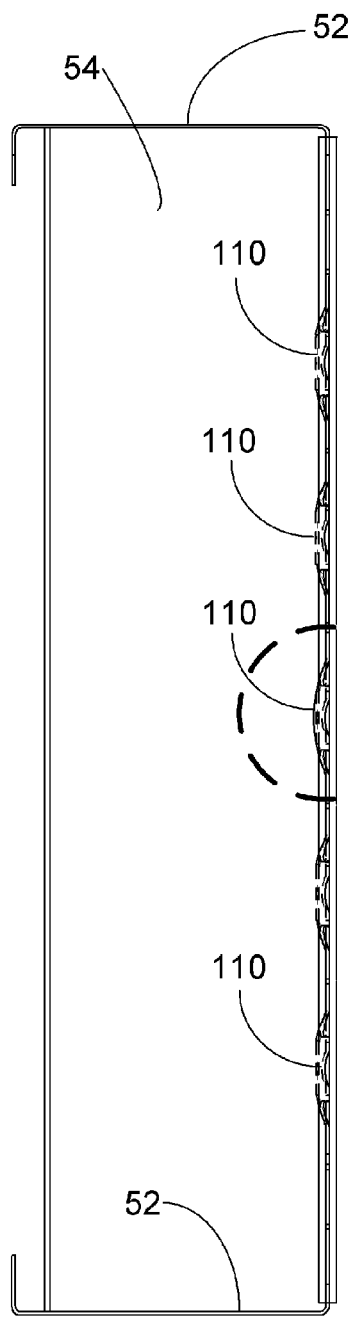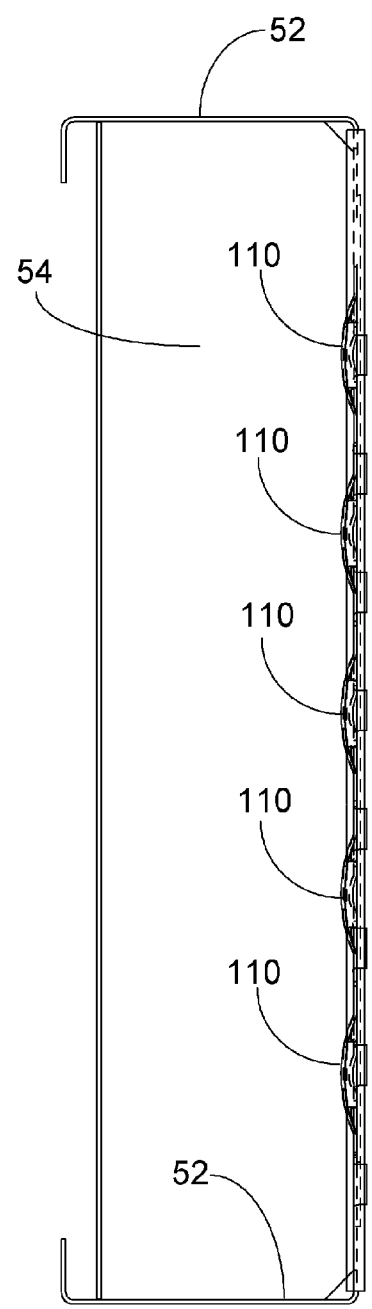
FIG. 28          FIG. 30          FIG. 29

WET SCRUBBER TRAY

This application claims priority to U.S. Provisional Patent Application Ser. No. 61/061,900, filed Jun. 16, 2008.

FIELD AND BACKGROUND OF THE INVENTION

The present invention relates to methods and apparatus for obtaining counter-current gas-liquid contact, such as wet scrubbers which involve gas-liquid contact between flue gas containing sulfur oxides and a slurry or solution containing reactive materials as a chemical reacting absorbing medium. More particularly, the present invention is drawn to an improved wet scrubber tray construction and a gas-liquid contact apparatus employing same.

Wet scrubber gas-liquid contact systems used for the removal of sulfur oxides ($SO_x$) from flue gases produced from the combustion of fossil fuels are well known. See for example U.S. Pat. No. 4,263,021 to Downs et al., the text of which is hereby incorporated by reference as though fully set forth herein. Additional details of wet scrubber systems for $SO_x$ removal are provided in Chapter 35 of *Steam/its generation and use*, 41$^{st}$ Edition, Kitto and Stultz, Eds., Copyright© 2005, The Babcock & Wilcox Company, the text of which is hereby incorporated by reference as though fully set forth herein. Such systems are also referred to as wet flue gas desulfurization (WFGD) systems.

FIGS. 1 and 2 illustrate components of one type of known wet scrubber system, generally designated 10, described in the aforementioned *Steam* 41$^{st}$ reference. $SO_2$-laden flue gas 12 enters the side of the spray tower absorber 14 at approximately its midpoint and exits through a transition 16 at the top. The upper portion of the module (absorption zone 18) provides for the scrubbing of the flue gas 12 to remove the $SO_2$ while the lower portion of the module serves as an integral slurry reaction tank (also frequently referred to as the recirculation tank and oxidation zone 20) to complete the chemical reactions to produce gypsum. Other key components shown include the slurry recirculation pumps 22, spray headers 24 (which may be conventional or interspatial design) and nozzles for slurry injection, moisture separators 26 (typically of a chevron design) to minimize moisture carryover, oxidizing air injection system 28, slurry reaction tank mixers or agitators 30 to prevent settling, and a perforated tray 32 that reduces flue gas flow maldistribution to enhance $SO_2$ removal performance. Flues leading from the transition 16 convey the cleaned flue gas 34 from the wet scrubber 14.

The perforated tray 32 is provided with a plurality of holes 36 (typically 1⅜ inches diameter) and provides intimate gas/liquid contacting and increases the slurry residence time in the absorption zone. The tray 32 creates more surface area between the slurry and the flue gas 12, and also provides significant holdup time for the slurry. This increases the limestone dissolution in the absorption zone 18 and increases the absorption per unit volume. Some spray tower absorbers 14 have two levels of trays providing multiple contact zones for $SO_2$ removal. Absorber modules that do not use a tray are referred to as open spray towers.

Recently, after a period of operation, some perforated trays have begun to exhibit cracking. This cracking has appeared in two areas.

Crack site 1. In the center stiffener, cracks were found at the end of the stiffener adjacent to a field weld joining the affected tray with its neighboring tray. These cracks were found to be initiating from the field welds, traveling horizontal into the center stiffener web. The orientation of the crack suggested that it was following a line of maximum bending stress caused by lateral movement of the top corner of the center stiffener. The forces causing this movement were thought to be random buffeting of the stiffener by flue gas and/or slurry spray. The initiation point at the field weld was caused by the Fatigue Strength Reduction Factor (FSRF) inherent to all welds.

Crack site 2. In the perforated bottom plate region adjacent to both the intermittent shop welds joining the center stiffener to the perforated bottom plate, and in the intermittent field welds connecting the trays to the steel support grid. The field welds are located at the end edges of the perforated bottom plate. The cracks were observed to initiate at the ends of the weld segments, traveling to the nearest hole in the perforated bottom plate. There were some instances where the cracks would initiate at both ends of a series of weld segments. This condition would effect the support boundary conditions of the perforated bottom plate in such a way that chaining of cracks would occur. This chaining effect had the potential of compromising the structural integrity of the perforated bottom plate, causing large sections of the perforated bottom plate to fall out, reducing the effectiveness of the function of the tray and creating a risk of pieces being sucked into the slurry recirculation pumps.

Metallurgical examinations confirmed that the cracking was due to mechanical fatigue. This fatigue was thought to be induced by mechanical vibration from an unknown origin. No evidence of stress corrosion cracking or brittle fracture was found. The heat affected zone (HAZ) adjacent to the welds was also examined and found to be in satisfactory condition.

SUMMARY OF THE INVENTION

The present invention provides an improved wet scrubber perforated tray that provides increased resistance to vibration-induced cracking that is simple in design, rugged in construction, and economical to manufacture. The various features of the improved wet scrubber tray may be used singly or in any combination.

Accordingly, one aspect of the present invention is drawn to a modification of the sides of the tray to make the tray self supporting and to eliminate wastage of raw material. The original tray design had a high side and a low side that required the field welding of the low tray side to the high side of its neighboring tray to complete its support requirements. This construction required an extra shearing operation by the tray fabricator and the subsequent wastage of material. By providing two, equal height, side stiffeners, the tray stiffness is markedly increased. This change also eliminated the difficult field weld of the low side to the neighboring high side. In addition, the elimination of this field weld helped solve the cracking problem at Crack Site 1.

Another aspect of the present invention is drawn to the addition of an internal stiffener to the tray to make two intermediate stiffeners. The original design had one center stiffener that acted as a baffle for functional reasons, to stiffen the perforated bottom plate, and to provide a positive brace for the side stiffeners. The one problem with this design is that it still did not prevent the side stiffeners from warping. The addition of an internal stiffener eliminated the possibility of warping due to gas or spray buffeting. The previously mentioned aspect also worked to the benefit of this aspect by allowing for a shop weld to be applied at both ends of the intermediate stiffeners. The original tray design required field welding the center stiffener end to the neighboring tray high side. It is this field weld that provided the initiation point for the Crack Site 1 cracking. With certain changes in the specific design of the intermediate stiffeners, the intermediate stiffeners may be shop-installed or field-installed.

Yet another aspect of the present invention is drawn to a change in the connection of the intermediate stiffeners to the perforated bottom plate to eliminate the shop weld in the bottom plate. This new arrangement, in a preferred embodiment, uses a 1 inch strip of metal with slots in it to capture the bottom perforated plate. The same pattern of slots is in the perforated bottom plate. In this design the intermediate stiffeners have tabs on their bottom edges that will protrude through the slots. The tabs are then welded to the 1 inch strip. There is no fusion of the 1 inch strip to the perforated bottom plate. In addition, a welding sequence is specified to minimize residual weld stresses.

Still another aspect of the present invention involves repositioning the holes in the perforated bottom plate so that they are moved away from the boundaries of the tray to reduce their influence on boundary conditions. This is especially true along the intermediate stiffeners where holes are arranged to provide a landing for the stiffener attachment slots.

Yet still another aspect of the present invention involves increasing the thickness of the tray material to lower the vibratory stresses that are causing the cracking. This increase in thickness, along with the addition of the internal stiffener, will also increase the natural frequencies of the tray. It is well established that the displacements and stresses in a vibrating structure will decrease as the frequency increases. Lowering the vibratory stresses is probably the most effective way to reduce fatigue.

Still another aspect of the present invention involves a change in the mechanism for holding the trays themselves within the spray absorber tower; according to the present invention, the trays are now held down by plate material that is attached to the support grid, but not to the trays. This feature was instituted primarily to get the remainder of the field welds out of the perforated bottom plate.

Yet still another aspect of the present invention involves application of three field welds to the sides of each tray to hold the trays in place relative to each other. These field welds are much easier to make than the field welds on the original trays. In addition to holding the trays in place, these welds are strategically placed to allow adjacent side stiffeners to act together as a composite section, thus increasing their strength.

Another aspect of the present invention involves the use of an elastomeric material such as neoprene material at the tray-to-grid attachments. This neoprene material was added in an effort to buffer the tray bottom plate from the sharp edge of the hold-down plate. Subsequent experimentation indicated that the neoprene material increases the damping of the system. It is scientific fact that introducing additional damping to a vibrating system decreases the responses of the system, thereby decreasing the stresses in the structure. The inclusion of this neoprene material also has the additional benefit of isolating the tray from any lateral motions or restraint imposed by the support grid. In a preferred embodiment, an extruded neoprene "boot" that puts neoprene on both the top and bottom of the tray is used. Experimentation indicates that this supplies the greatest damping.

Yet still another aspect of the present invention is drawn to a stiffened tray for a wet scrubber installation which employs one or more features such as reinforcing ribs in the bottom of the tray. The ribs may have various profiles and run in any direction on the tray in order to provide the desired stiffness. Alternatively, or in addition thereto, the perforations in the trays may be provided with a boss punched through or indented around the perforations. Still further, single or multiple domes or bulges, or dimples, may be provided in the trays to provide additional stiffness.

If the desired stiffness is achieved via use of these features, instead of using thicker material for the trays, significant material cost savings can be realized. The reduced weight of trays made of more lightweight gauge materials also facilitates physical handling of the individual trays by shop manufacturing and field installation personnel.

The various features of novelty which characterize the invention are pointed out with particularity in the claims annexed to and forming a part of this disclosure. For a better understanding of the invention, its operating advantages and the specific benefits attained by its uses, reference is made to the accompanying drawings and descriptive matter in which preferred embodiments of the invention are illustrated.

BRIEF DESCRIPTION OF THE DRAWINGS

In the Figures:

FIG. 5 is a plan view of an embodiment of a shop-fabricated wet scrubber tray with shop-installed intermediate stiffeners according to the present invention;

FIG. 6 is a sectional view of FIG. 5 viewed in the direction of arrows 6-6 of FIG. 5;

FIG. 9 is a plan view of another embodiment of a shop-fabricated wet scrubber tray with shop-installed intermediate stiffeners according to the present invention;

FIG. 10 is a sectional view of FIG. 9 viewed in the direction of arrows 10-10 of FIG. 9;

FIG. 13 is a perspective schematic illustration view of another embodiment of a stiffened wet scrubber tray according to the present invention;

FIG. 14 is a sectional view of FIG. 13 viewed in the direction of arrows 14-14 of FIG. 13;

FIG. 15 is a perspective schematic illustration view of another embodiment of a stiffened wet scrubber tray according to the present invention;

FIG. 16 is a sectional view of FIG. 15 viewed in the direction of arrows 16-16 of FIG. 15;

FIG. 17 is a perspective schematic illustration view of another embodiment of a stiffened wet scrubber tray according to the present invention;

FIG. 18 is a sectional view of FIG. 17 viewed in the direction of arrows 18-18 of FIG. 17;

FIG. 19 is a sectional view of FIG. 17 viewed in the direction of arrows 19-19 of FIG. 17;

FIG. 21 is a sectional view of FIG. 20 viewed in the direction of arrows 21-21 of FIG. 20;

FIG. 22 is a sectional view of FIG. 20 viewed in the direction of arrows 22-22 of FIG. 20;

FIG. 23 is a sectional view of FIG. 20 viewed in the direction of arrows 23-23 of FIG. 20;

FIG. 24 is a sectional view of FIG. 20 viewed in the direction of arrows 24-24 of FIG. 20;

FIG. 25 is an end view of a portion of FIG. 20 viewed in the direction of arrows 25-25 of FIG. 20;

FIG. 26 is a plan view of yet still another embodiment of a stiffened wet scrubber tray according to the present invention;

FIG. 28 is a sectional view of FIG. 26 viewed in the direction of arrows 28-28 of FIG. 26;

FIG. 29 is a sectional view of FIG. 26 viewed in the direction of arrows 29-29 of FIG. 26; and FIG. 30 is a close-up sectional view of the circled portion of FIG. 28.

DESCRIPTION OF THE PREFERRED EMBODIMENTS

The natural circular frequency of a single degree of freedom component can generally be represented by the relationship:

$$\omega_n = \sqrt{k,m} \tag{1}$$

where: $\omega_n$=circular frequency
k=stiffness
m=mass

If the observed tray cracking is vibration-induced, the amplitude of the portions undergoing vibration is such that the stresses are exceeding the endurance limit, and the failures are due to fatigue. One way to reduce the amplitude of any component undergoing vibration at a given frequency is to increase the natural frequency of the component. Based upon the above relationship, increasing the stiffness-to-mass ratio of the component will increase the natural frequency. Thus, if the driving forces remain at the same frequency, stiffening the trays will reduce their likelihood to vibrate, thereby reducing the amplitude of vibration and the resulting flexural stresses experienced. The present invention thus provides several ways to increase the stiffness of the tray, increase natural frequency and reduce stress.

Figures 1, 2:
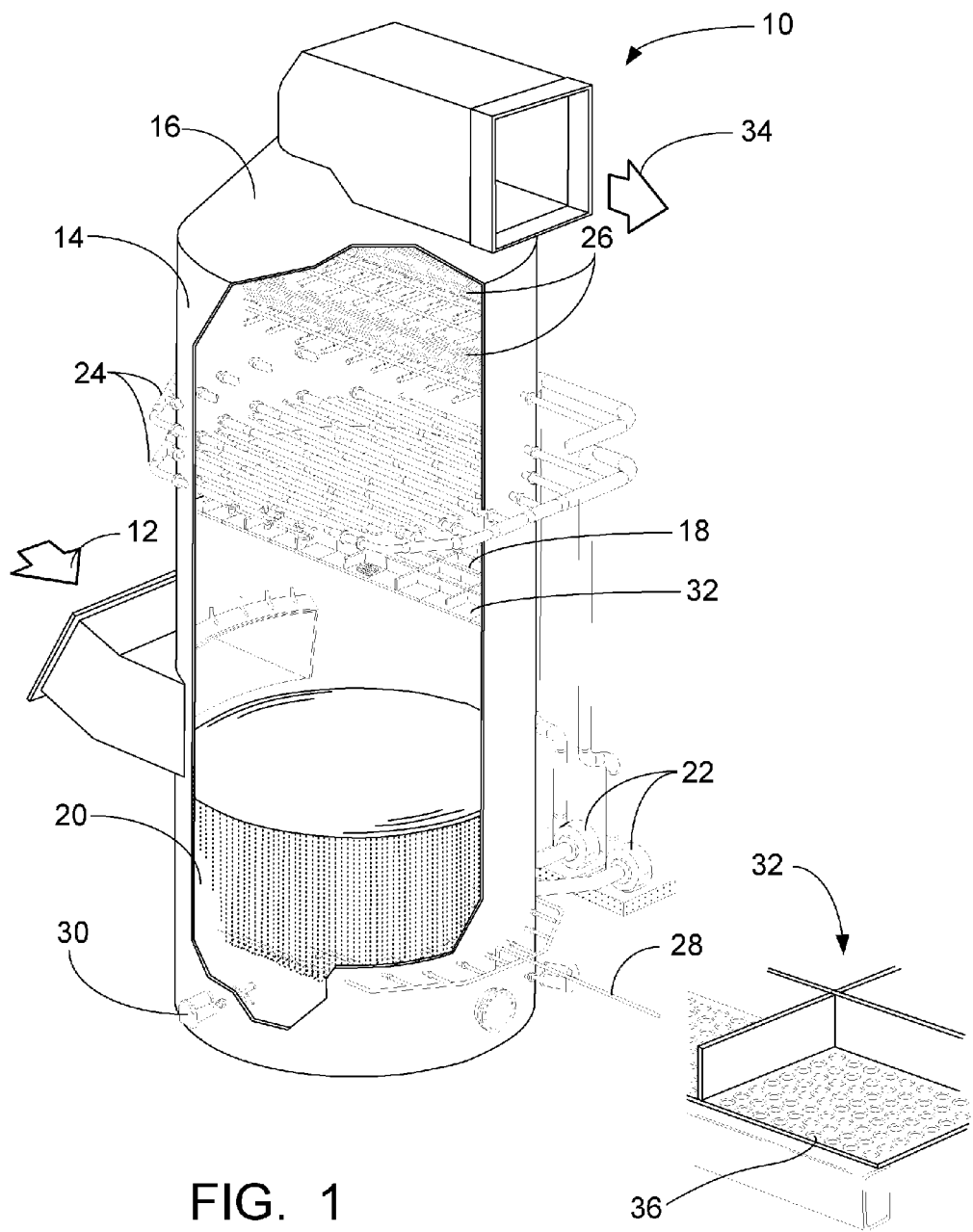
FIG. 1 is a perspective elevation view, partly in section, of a known wet scrubber absorber tower.
FIG. 2 is a perspective elevation view of the perforated tray used in the wet scrubber absorption tower of FIG. 1.
Figure 3:
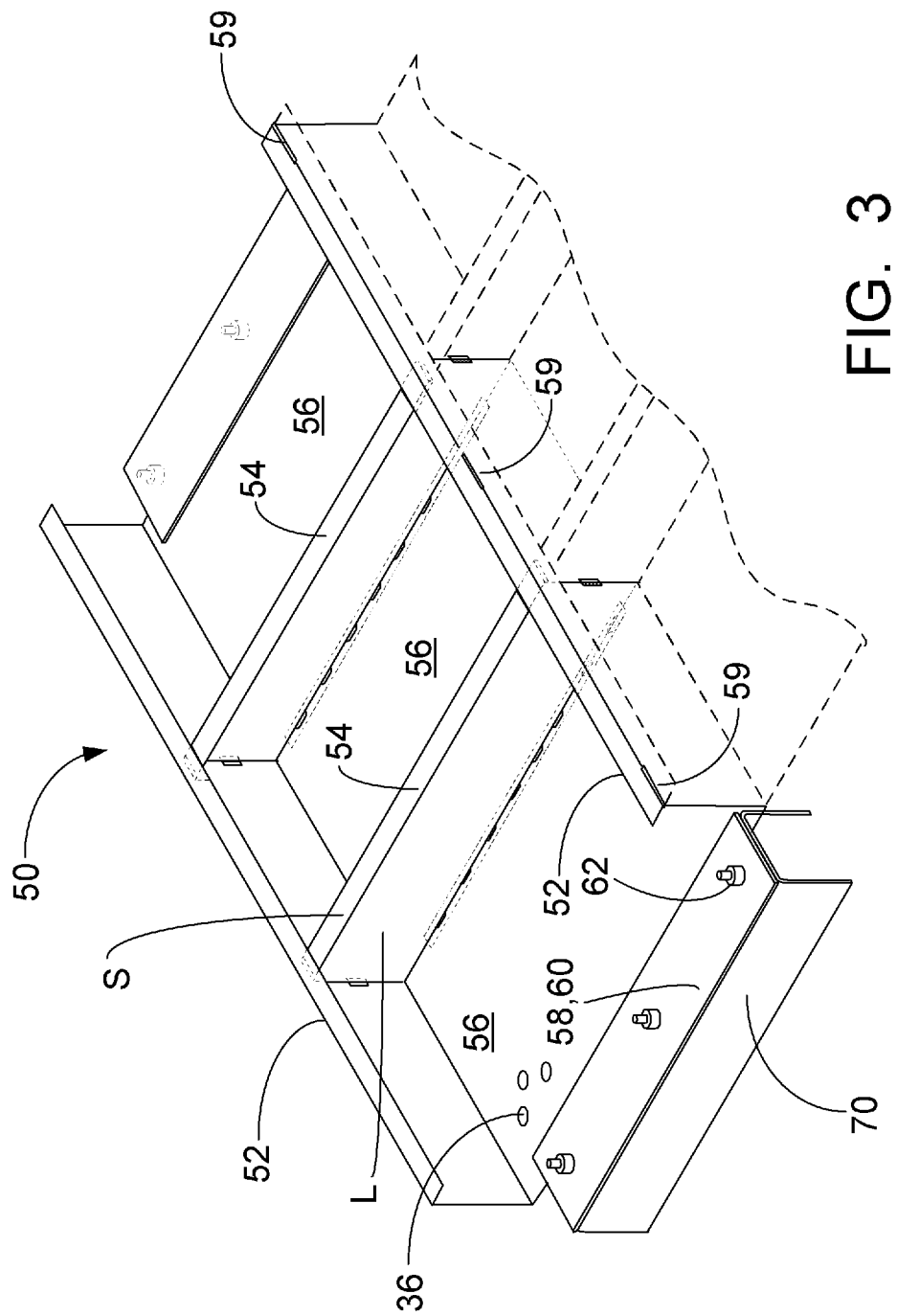
FIG. 3 is a perspective schematic illustration of a redesigned, shop-fabricated wet scrubber tray with shop-installed intermediate stiffeners according to the present invention.

Referring to the drawings generally, wherein like reference numerals designate the same or functionally similar elements throughout the several drawings, and to FIG. 3 in particular, there is shown a perspective schematic illustration of a redesigned, shop-fabricated wet scrubber tray, generally designated 50, with shop-installed intermediate stiffeners according to the present invention.

As shown in FIG. 3, each of the new shop-fabricated trays 50 have equal height side stiffeners 52, rather than the unequal height side stiffeners of existing tray designs, plural intermediate stiffeners 54 (in this embodiment, two; three or more may be employed) and a perforated lower portion or bottom plate 56 (most of the perforations 36 have been omitted for clarity). The perforated plate 56 is provided with substantially symmetrically spaced relatively large openings or perforations 36 to form an open area therethrough; advantageously this open area can be provided by a plurality of holes or perforations 36 which may be 1⅜ inch diameter. The perforations 36 may be provided on a staggered or straight-line pattern. In accordance with one aspect of the invention, the perforations 36 are also repositioned or "pulled away" from the edges of the perforated plate 56 so that they are moved away from the boundaries of the tray to reduce their influence on boundary conditions and thereby reduce the tendency for cracks to initiate. See FIG. 5. The intermediate stiffeners 54 are preferably L-shaped with a short leg S and a long leg L; this cross section provides stiffness both to the stiffeners 54 and the tray 50 to which they will be attached. The long leg of the stiffener 54 is placed against the tray bottom 56 upon installation. There are no welds of the intermediate stiffeners 54 to the tray bottom 56. The intermediate stiffeners 54 may be the same height as the side stiffeners 52, or they may have different height(s) if desired. The intermediate stiffeners 54 divide the tray 50 into compartments, and the two intermediate stiffeners 54 stabilize each of the side stiffeners 52 at two points.

The trays 50 rest upon suitable structural support members 70 which establish and maintain the trays 50 in a substantially horizontal position. The support members 70 are attached to the walls of the spray tower absorber 14 and the trays 50 extend transversely across the spray tower absorber 14 as small or large elements forming a perforated barrier to gas flow upwardly and liquid flow downwardly through the spray tower absorber 14. At each end of the tray 50, in contrast to prior practice of welding the tray to the supports in the field, a tie-down plate 58 and an elastomeric pad 60 made of a material such as rubber or, advantageously, neoprene, are used to hold down adjacent ends of two adjoining trays 50 via fasteners 62. Advantageously, the fasteners 62 comprise a bolt welded to the support members and an associated washer and nut assembly. As described later, apertures are provided in the tie-down plate 58 and notches are provided in the elastomeric pad 60 to accept the fasteners. The elastomeric pad 60 may have different configurations; it may comprise a single pad which spans the adjacent ends of two adjoining trays 50, or it may comprise two U-shaped pads or boots which extend around the adjacent ends of two adjoining trays 50. Tray-to-tray groove welds 59, advantageously three, are provided between and at an upper edge of adjacent side stiffeners 52 of adjacent trays 50, and serve to strengthen both adjacent trays 50.

The intermediate stiffeners 54 may be applied to the trays 50 in the shop, or they may be field installed. In the case of field "fixes", certain aspects of the shop-fabricated trays 50 according to the present invention and their method of installation cannot be employed. For example, since in an existing wet scrubber the trays may be welded to the supports, the use of the tie-down plate 58 and the elastomeric pad 60 to hold down adjacent ends of two adjoining trays 50 via fasteners 62 cannot be employed. In this case, the additional stiffening must be supplied primarily via the application of the intermediate stiffeners of the present invention. Slight differences are thus required in the configuration of field-installed intermediate stiffeners 54 versus the configuration of shop-installed intermediate stiffeners 54 used in the construction of the shop-fabricated trays 50, as will be described in the following paragraphs.

Figure 7:
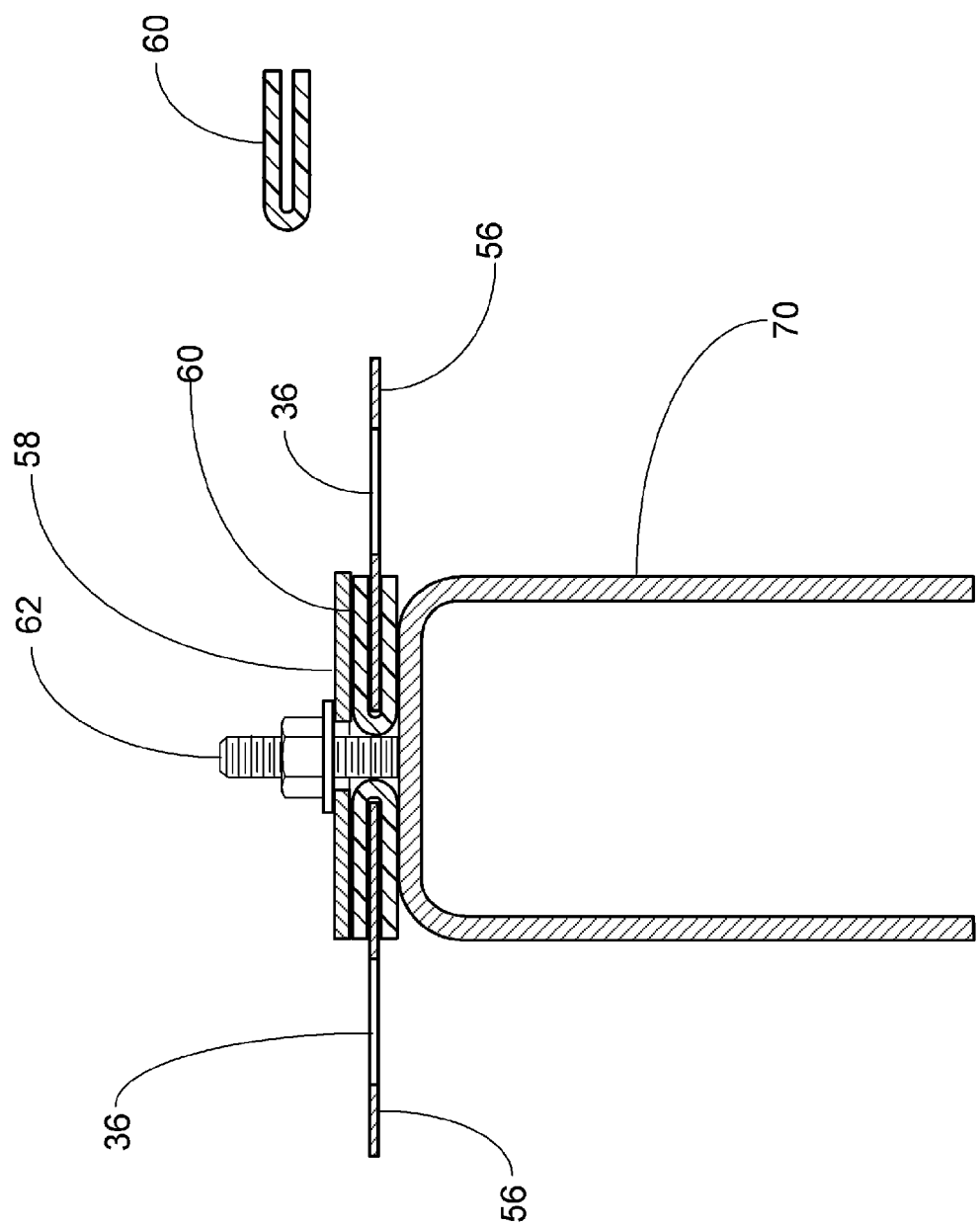
FIG. 7 is a sectional view of FIG. 5 viewed in the direction of arrows 7-7 of FIG. 5.

As illustrated in FIGS. 5-7, in the case of shop-installed intermediate stiffeners 54, the intermediate stiffeners 54 span the distance between the side stiffeners 52 across the bottom plate 56 of the tray 50. Ends of the intermediate stiffeners 54 are shop welded at 68 to the side stiffeners 52. The bottom edge of each of the intermediate stiffeners 54 is provided with a plurality of straight fingers or tabs 64 which are spaced so as to correspond to slots 65 in the bottom 56 of the tray 50. The tabs 64 extend through the slots 65 and pass through corresponding slots in a strip 66 placed below the bottom 56 of the tray 50. In a preferred embodiment, the strip 66 is a 1 inch wide strip of metal also with slots 65 in it; the intermediate stiffeners' 54 tabs 64 protrude through the slots 65 in the bottom 56 of the tray 50 and into the corresponding slots 65 in the strip 66. The tabs 64 are then welded to the strip 66. There is no fusion of the strip 66 to the perforated bottom plate 56.

Figure 4:
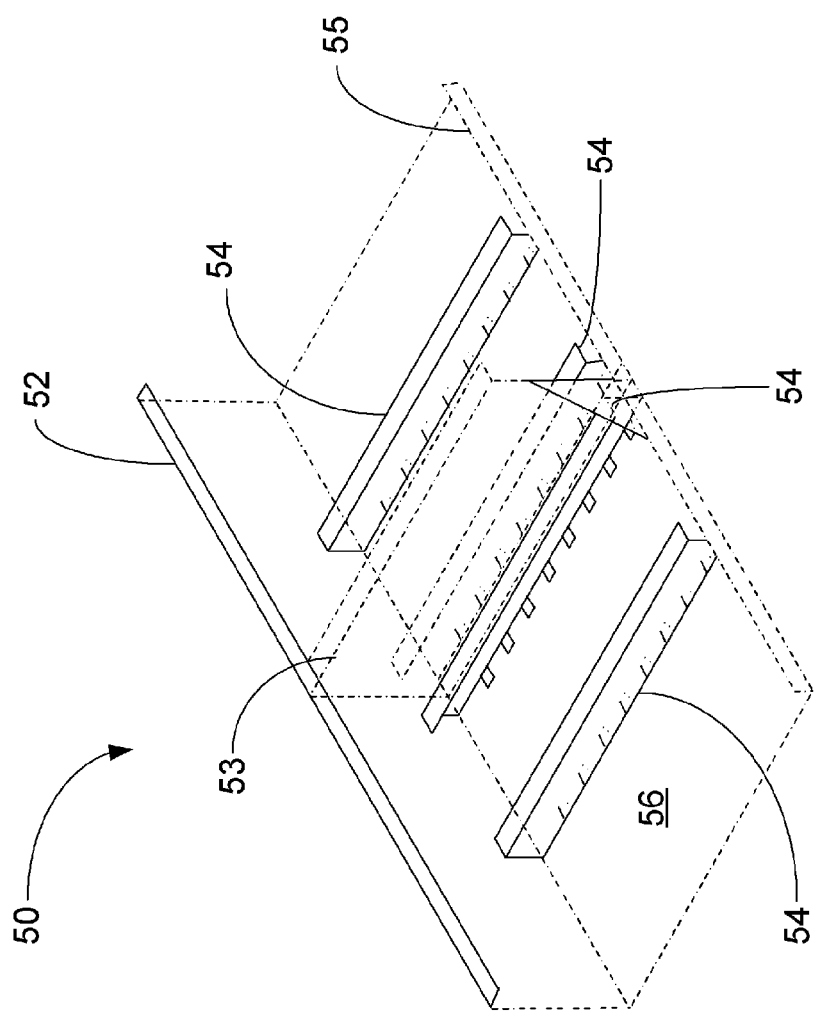
FIG. 4 is a perspective schematic illustration of a known, perforated wet scrubber tray with field-installed intermediate stiffeners according to the present invention.
Figure 4A:
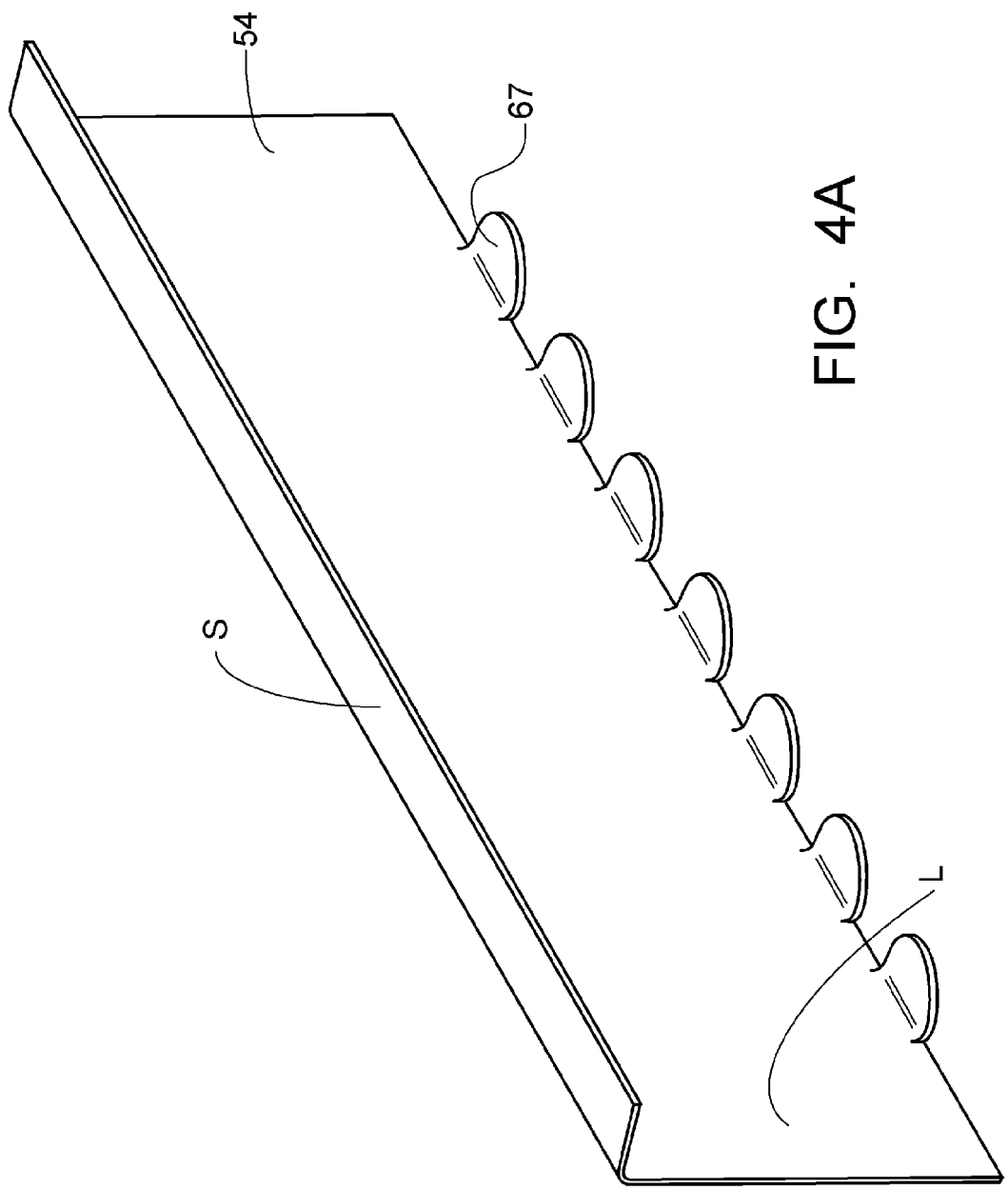
FIG. 4A is a perspective schematic illustration of a field-installed intermediate stiffener of the type depicted in FIG. 4 according to the present invention.

As illustrated in FIGS. 4 and 4A, in the case of field-installed intermediate stiffeners 54, the intermediate stiffeners 54 also span the distance between the side stiffeners 52 across the bottom plate 56 of the tray 50. However, the approach of welding straight fingers or tabs 64 to a strip 66 located beneath the tray 50 cannot be used because welding access to the underside of the tray 50 is unavailable. In this case longer, bent fingers 67 are provided along the bottom long leg edge of each of the field-installed intermediate stiffeners 54. The fingers 67 are preferably bent at an angle of greater than about 90 degrees with respect to the plane of the long side L of the intermediate stiffeners 54. The spacing of the bent fingers 67 along the bottom edge corresponds to the spacing of the perforations 36 in the bottom plate 56, and the size of each of the bent fingers 67 is such that they can be readily received by the perforations 36 during installation and contact adjacent ligaments to support the tray 50. Field installation of any of the intermediate stiffeners 54 is accomplished by locating an intermediate stiffener 54 above the bottom 56 of the tray 50 with the bent fingers 67 aligned with a corresponding perforation 36. The stiffener 54 is then tipped towards the bottom 56 of the tray 50 and the bent fingers 67 are engaged with their corresponding perforations 36. The stiffener 54 is then tipped back to vertical to engage the bent fingers 67 through the perforations 36, hooking them underneath the bottom 56 of the tray 50, thereby increasing the stiffness of the tray 50. The bent fingers 67 through the existing perforations 36 prevent downward deflection of the bottom 56 of the tray 50, while the flat bottom edge of the intermediate stiffener prevents upward deflection of the bottom 56 of the tray 50.

Field welds are then made between the ends of the intermediate stiffeners 54 with the inside of the side stiffeners 52 and the existing side ledge 55; no other fusion welds are made between the intermediate stiffeners 54 and the tray 50. Alternatively, these field welds could be dispensed with if a stamped feature of the side stiffeners 52, such as a spring tang formed in the side stiffeners 52, is employed. During installation, as the intermediate stiffeners 54 are being tipped back to vertical to engage the bent fingers 67 through the perforations 36, the ends of the intermediate stiffeners 54 could then be drawn past the spring tang which would then snap back into place and hold the intermediate stiffeners 54 in place. The field-installed intermediate stiffeners 54 will help stabilize the side stiffeners 52 against warping due to turbulence and buffeting. In addition, one of the major benefits of this aspect of the invention is that the installation of these field-installed stiffeners 54 can be done in a relatively short amount of time such that a customer does not have to wait until an extended outage to fix the trays 50.

Digressing for a moment, most trays 50 provided in wet scrubber absorber towers 14 are rectangular in shape with a center stiffener located between the long sides. It will thus be appreciated by those skilled in the art that while the term intermediate is often used in the present description to indicate that the added stiffeners of the present invention are typically placed in between an existing center stiffener and an end of the tray 50, it is possible to locate any of the additional stiffeners at any location along the tray 50, even at or near a central location. See FIG. 4. In some installations, a stiffener is not provided at the center of a tray 50, and is located instead at some other location. Further, while symmetrical locations of such stiffeners in the tray 50 might be preferred from a manufacturing standpoint, non-symmetrical stiffener spacing along the tray which provides compartments of varying sizes may be employed to further reduce the possibility of the stiffeners being placed at vibrational node locations along the tray that might lead to undesirable vibrational behavior.

Figure 8:
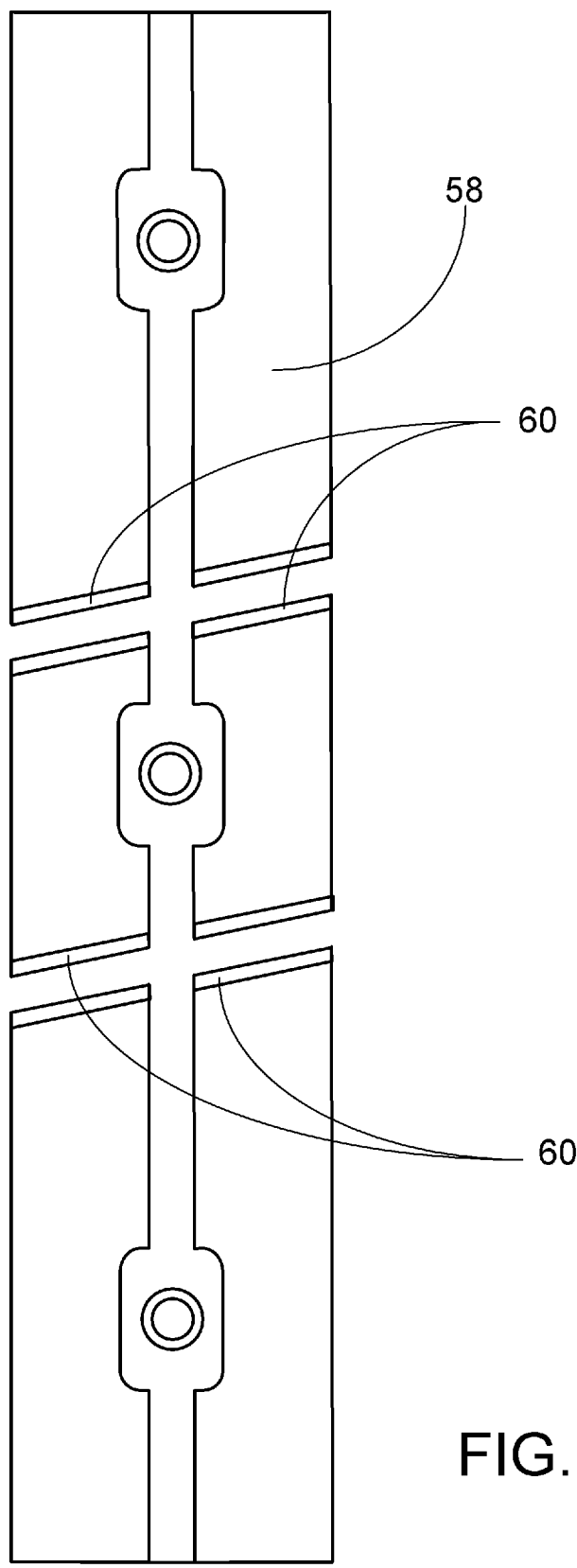
FIG. 8 is a plan view of the hold-down plate and neoprene boots of FIG. 5.
Figure 11:
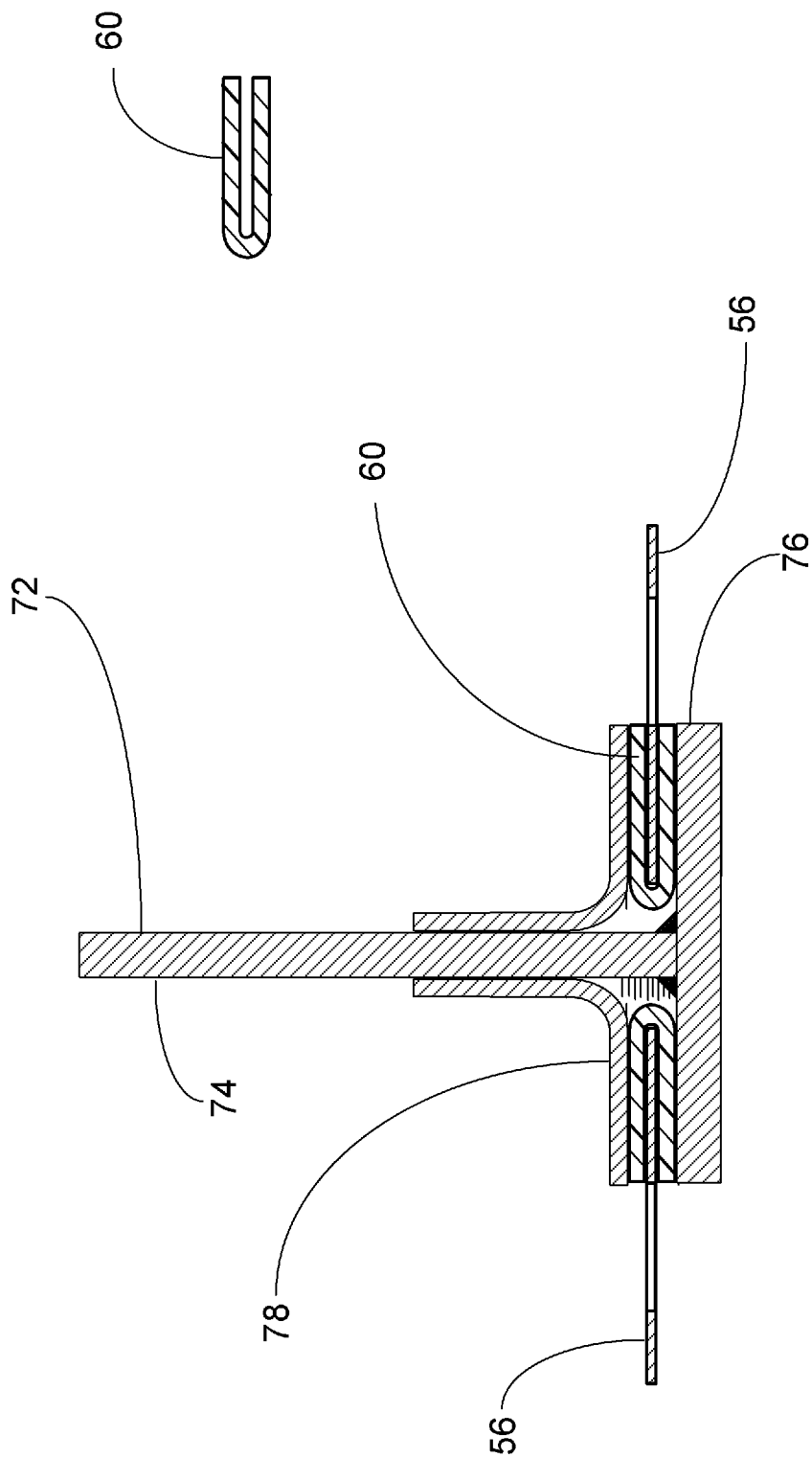
FIG. 11 is a sectional view of FIG. 9 viewed in the direction of arrows 11-11 of FIG. 9.

Referring again to FIG. 7, FIG. 7 illustrates the use of the tie-down plate 58 and elastomeric pad or boot 60 and fasteners 62 to secure adjacent edges of trays 50 to a support beam or member 70. Here, the elastomeric pad 60 is an extruded U-shape, advantageously 3/16 inch thick, with a Shore Type A-50 durometer hardness. The hardness may range between approximately 40-60 Shore Type A durometer hardness, depending upon the amount of dampening and preload desired, as well as economic concerns. Armaflex® 520 adhesive (available from Armaflex LLC of Mebane, N.C.) or equivalent is used to secure the elastomeric boot 60 to the tray 50 edges before tray shipment. FIG. 8 illustrates the assembled tie-down plate 58 and a neoprene boot 60; notches and/or apertures are provided in both parts to permit the fasteners 62 to extend therethrough for assembly and a notch is pre-cut into the boot 60 to permit drainage.

Figure 12:
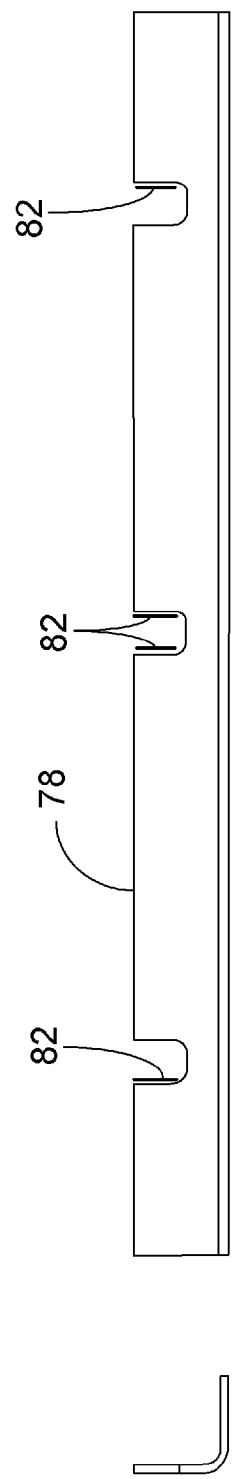
FIG. 12 is an illustration of a typical configuration of the bent plate angles of FIG. 11 used to secure the bottom tray plate of FIG. 11.
Figure 20:
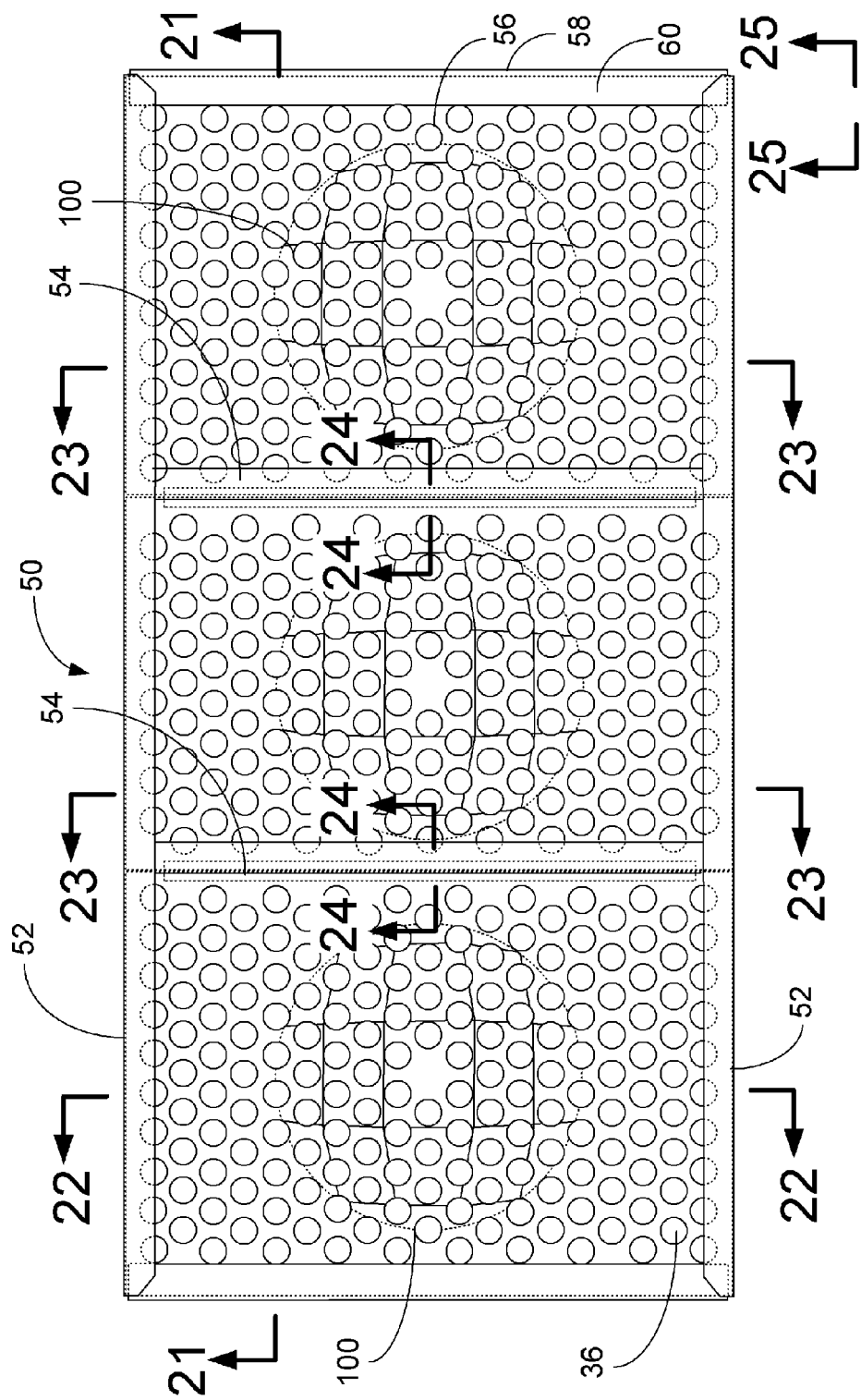
FIG. 20 is a plan view of yet another embodiment of a stiffened wet scrubber tray according to the present invention.
Figure 27:
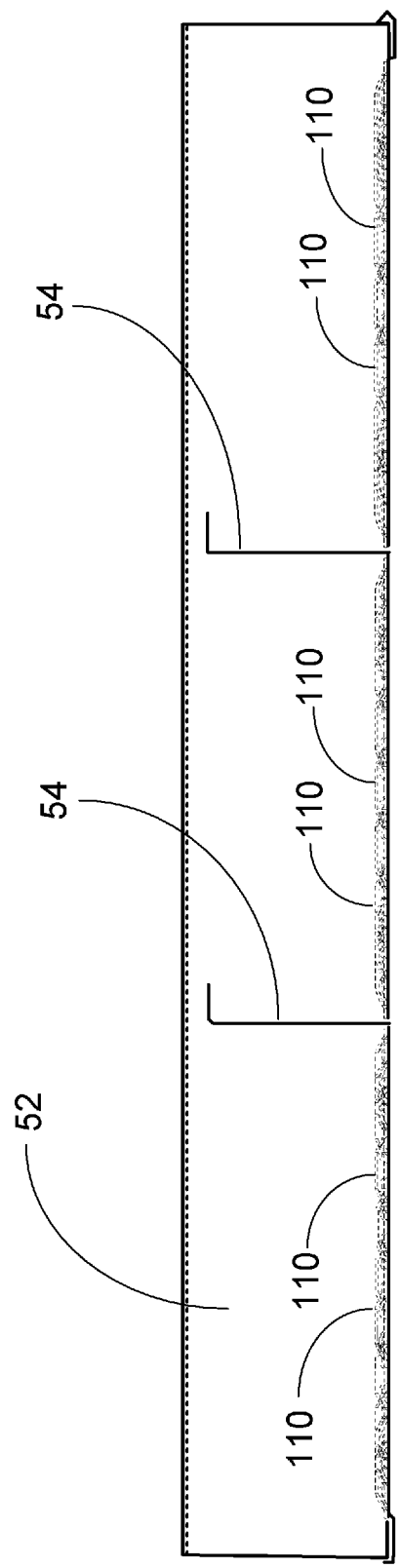
FIG. 27 is a sectional view of FIG. 26 viewed in the direction of arrows 27-27 of FIG. 26.

FIGS. 9, 10, 11 and 12 illustrate another embodiment of how the ends of adjacent trays 50 may be held down at locations where the tray 50 supports have a different configuration. In this embodiment, the support beam 72 is an inverted TEE shape comprised of a vertical plate 74 welded to a horizontal plate 76. The support beam 72 may itself be supported from a truss member extending across a diameter or chord of the wet scrubber 10. The ends of adjacent trays 50 rest upon the horizontal plate 76. Ends of the adjacent trays 50 are again provided with a neoprene boot 60, glued as before. Bent plate angles 78 of a desired length, and which may be straight or curved (if adjacent the curved outer shell of the wet scrubber 10), are then used to retain the ends of the trays 50 in place. FIG. 12 illustrates a typical configuration of the bent plate angles 78 and the placement of the field welds 82 used to secure the bent plate angles 78 to the support beam 72, including installations adjacent the outer curvature of the spray tower absorber 10 housing.

FIGS. 13-19 illustrate other ways to increase tray natural frequency by providing an increased stiffness to mass ratio. Some of these aspects may be used to influence scrubber performance. The increased tray 50 stiffness to mass ratio involves forming specific features in the trays 50. In some of these Figs., perforations 36 have been omitted for clarity; similarly, only one intermediate stiffener 54 is shown for clarity. These features include providing one or more reinforcing ribs 90 in the bottom 56 of the tray 50; these ribs can be stamped, bead rolled or bent into the surface of the bottom 56 of the tray 50. The ribs may run in any direction on the tray 50 in order to provide the desired stiffness, and may be a height of from ½ to twice the thickness of the bottom plate 56. In addition, various profiles of the ribs 90, such as triangular or semi-circular, may be used. Alternatively, or in addition thereto, a boss punched through or indented around the perforations 36 in the tray 50 may be provided.

FIGS. 20-30 illustrate still other ways to increase tray natural frequency by providing an increased stiffness to mass ratio. Some of these aspects may be used to influence scrubber performance. The increased tray 50 stiffness to mass ratio involves forming specific features in the trays 50. These features include providing one or more large domes or bulges 100 in the bottom 56 of the tray 50; these domes 100 can be stamped or bent into the surface of the bottom 56 of the tray 50. In one embodiment, each of the domes 100 may be on the order of about 15" diameter. In FIGS. 20-25, the domes 100 may be provided in each of the compartments created on the tray 50 by the intermediate stiffeners 54, approximately in the center portions thereof. While the domes 100 may be provided as features which extend above the surface of the bottom 56 of the tray 50, it is also possible to provide them as features which extend below the bottom surface 56 of the tray 50, in which case these features may also be referred to as large dimples 100. Alternatively, in FIGS. 26-30, a plurality of smaller domes or bulges 110 may be provided in the bottom 56 of the tray 50. A plurality of these smaller domes or bulges 110 may be provided in each of the compartments created on the tray 50 by the intermediate stiffeners 54, spaced as desired in each compartment. In one embodiment, each of the domes 110 may be on the order of about 3" diameter. It is also possible to provide these smaller domes or bulges as features which extend below the bottom surface 56 of the tray 50, in which case these features may also be referred to as small dimples 110. The additional stiffness provided by these dome features can permit a reduction in thickness from 11 gauge to 14 gauge, resulting in a material savings of about 37%.

While the principles of the present invention may be particularly applicable to new wet scrubber installations, it will be appreciated that the present invention may be applied to construction involving the replacement, repair or modification of existing wet scrubbers. In some embodiments of the invention, certain features of the invention may sometimes be used to advantage without a corresponding use of the other features. Accordingly, while specific embodiments of the present invention have been shown and described in detail to illustrate the application and principles of the invention, it will be understood that it is not intended that the present invention be limited thereto and that the invention may be embodied otherwise without departing from such principles. All such changes and embodiments properly fall within the scope of the following claims.

We claim:

1. A wet scrubber tray for a counter-current liquid gas contact device having walls defining an upright housing with a gas inlet and having means for passing gas upwardly therethrough, comprising: a perforated bottom plate provided with substantially symmetrically spaced relatively large openings to form an open area therethrough; equal height side stiffeners extending from first opposing edges of the perforated bottom plate and oriented substantially perpendicularly with respect thereto; and one or more intermediate stiffeners in between the side stiffeners and connected thereto and to the bottom plate, the stiffeners serving to increase the stiffness to mass ratio of the tray which increases the tray's natural frequency in order to decrease the tray's susceptibility to vibration-induced cracking;
wherein each intermediate stiffener is L-shaped and has a long leg and a short leg, and has a plurality of tabs extending from a bottom edge of the long leg, each tab being aligned with a corresponding slot in the bottom plate.

2. The wet scrubber tray according to claim 1, further comprising at least one or more ribs in the perforated bottom plate.

3. The wet scrubber tray according to claim 1, further comprising bosses around the perforations in the perforated bottom plate.

4. The wet scrubber tray according to claim 1, further comprising at least one or more domes or dimples extending above a surface of the perforated bottom plate.

5. The wet scrubber tray according to claim 1, wherein the tray comprises: a second set of opposed edges, each edge in the second set of opposed edges provided with interposed elastomeric material which contacts support members within the liquid gas contact device once the tray is installed therein, the elastomeric material providing additional damping to decrease the tray response to vibration and decrease the stresses in the tray, and isolating the tray from any lateral motions or restraint imposed by the support members.

6. The wet scrubber tray according to claim 5, wherein the second set of opposed edges is secured to the support members by a tie-down plate and interposed elastomeric material extending therebetween.

7. The wet scrubber tray according to claim 1, wherein each tab also passes through a corresponding slot in a strip placed below the bottom plate, and is welded to the strip.

8. The wet scrubber tray according to claim 1, wherein each tab is bent and hooked underneath the bottom plate such that the bent tab prevents downward deflection of the bottom plate and the bottom edge of the long leg prevents upward deflection of the bottom plate.

\* \* \* \* \*